Jan. 19, 1965   B. I. ULINSKI   3,166,139
LIFTING HEAD FOR INDUSTRIAL TRUCK
Filed Dec. 18, 1961   3 Sheets-Sheet 1
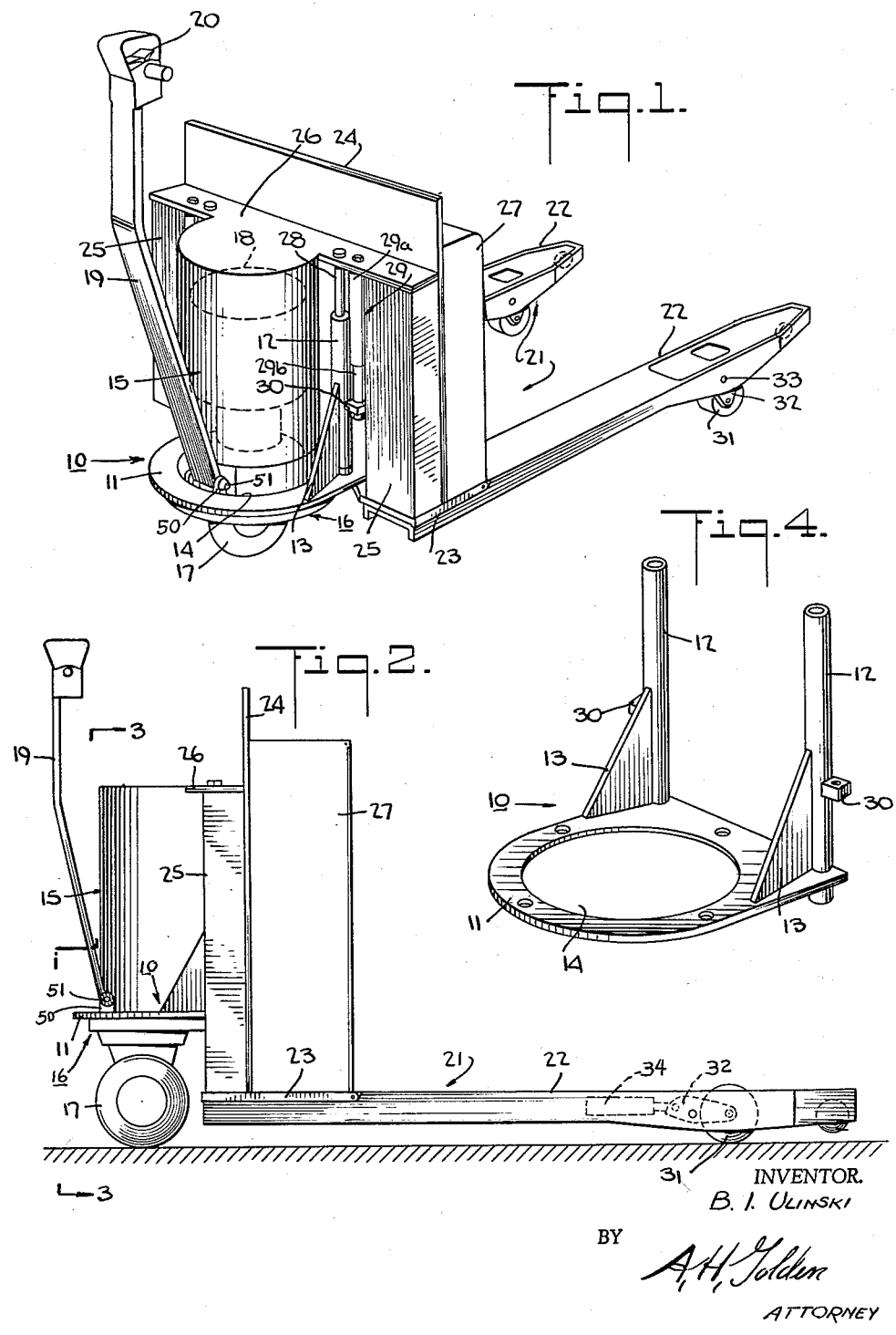
INVENTOR.
B. I. ULINSKI
BY
A. H. Golden
ATTORNEY Jan. 19, 1965   B. I. ULINSKI   3,166,139
LIFTING HEAD FOR INDUSTRIAL TRUCK
Filed Dec. 18, 1961   3 Sheets-Sheet 2
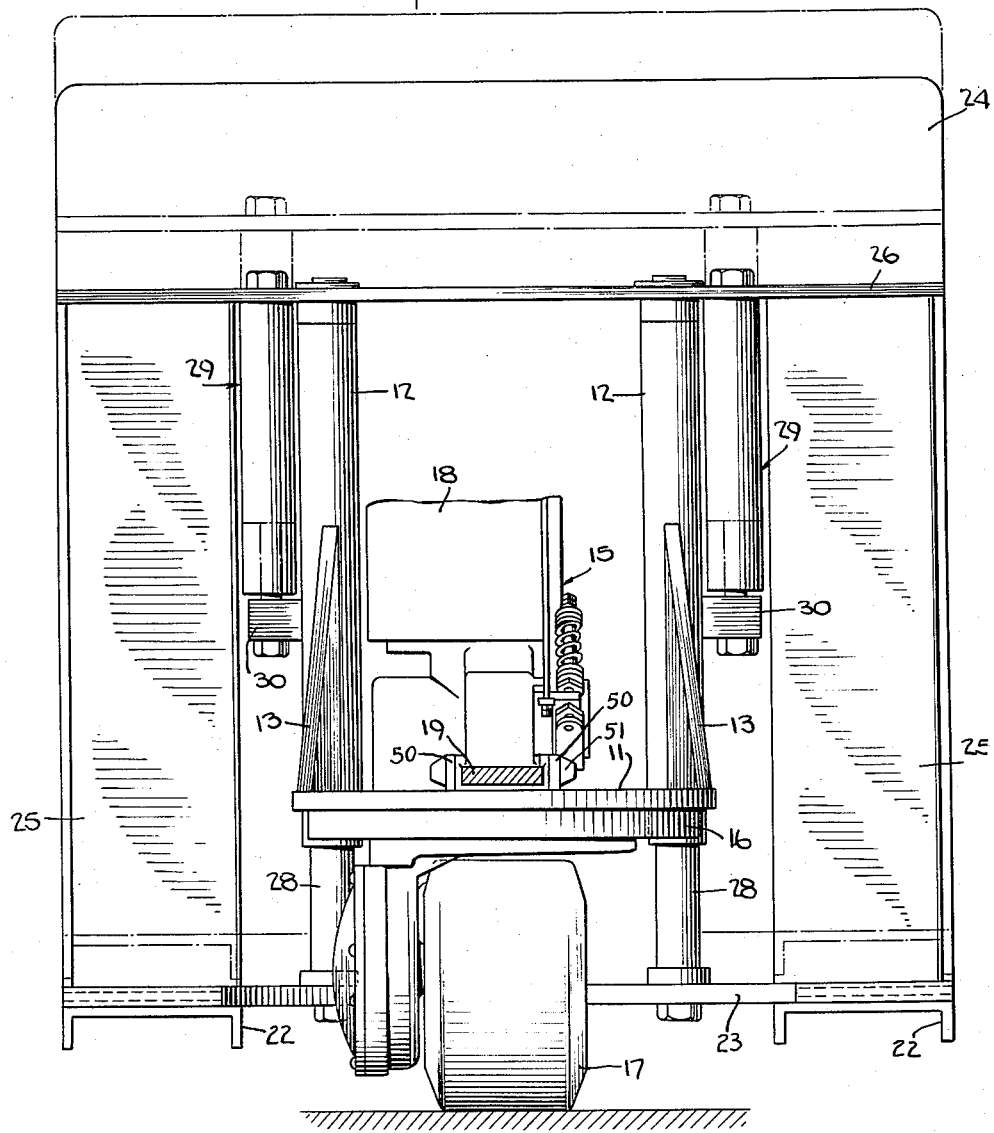
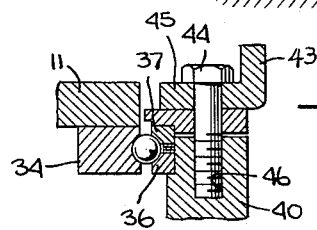
INVENTOR.
B. I. ULINSKI
BY
A. H. Golden
ATTORNEY

United States Patent Office 3,166,139
Patented Jan. 19, 1965

3,166,139
LIFTING HEAD FOR INDUSTRIAL TRUCK
Bronislaus I. Ulinski, Flossmoor, Ill., assignor, by mesne assignments, to Yale & Towne, Inc., New York, N.Y., a company of Ohio
Filed Dec. 18, 1961, Ser. No. 160,073
2 Claims. (Cl. 180—13)

This invention relates to an industrial lift truck of a type utilizing a load platform which is mounted at its forward end for vertical movement on a wheel-supported lifting head and which is supported at its rear end by downwardly pivoting wheels. The invention is particularly directed to the lifting head structure of such a truck through which the front end of the load platform is supported for vertical movement and on which the steerable front wheel is mounted.

While various lifting head constructions have heretofore been proposed and used, each of these constructions have been very complicated and costly, requiring elaborate systems of parallel links, channels and rollers, or plate slides and fabricated guide bearings for supporting and guiding the front end of the load platform during vertical movement.

The purpose of this invention is to provide a simple lifting head construction which eliminates the costly, complicated structures heretofore used for supporting and lifting the front end of the load platform and for supporting the steerable front wheel of the truck.

To this end, the lifting head of the truck consists of a simple horizontal plate having a pair of transversely spaced, vertically extending, elongated tubes secured thereto adjacent the rear edge. These tubes slidably receive simple vertical shafts which are secured to the load platform and serve to support and guide the forward end of the load platform during vertical movement thereof relatively to the lifting head through sliding movement of the shafts relatively to the tubes. Simple ram means extend between the main frame and the load platform to raise the load platform as the shafts and vertical tubes move relatively to one another. These rams are conveniently mounted on simple seats secured to the sides of the vertical tubes.

A steering unit, including a steerable ground wheel, is mounted for rotation on the horizontal plate by means of simple, easily detached bearing means. Thus, the principal supporting and lifting structure of the truck may be fabricated from inexpensive, readily available material, thereby contributing to decreasing the cost of the truck. Further, because of the length of the tubes, the clearance between the shafts and the tubes may be relatively great without affecting their guiding function, thereby eliminating the necessity of costly machining to provide a close fit.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring to the drawings:

FIG. 1 is a perspective view of a truck in which my invention is embodied, showing the load platform in a raised position;

FIG. 2 is a side elevational view of the truck shown in FIG. 1 but showing the load platform in a lowered position;

FIG. 3 is a rear view taken in the direction of the arrows 3—3 of FIG. 2;

FIG. 4 is a perspective view of the lifting head of the invention as disassembled from the truck;

FIG. 6 is a sectional view taken on the line 6—6 of FIG. 5.

Figure 5:
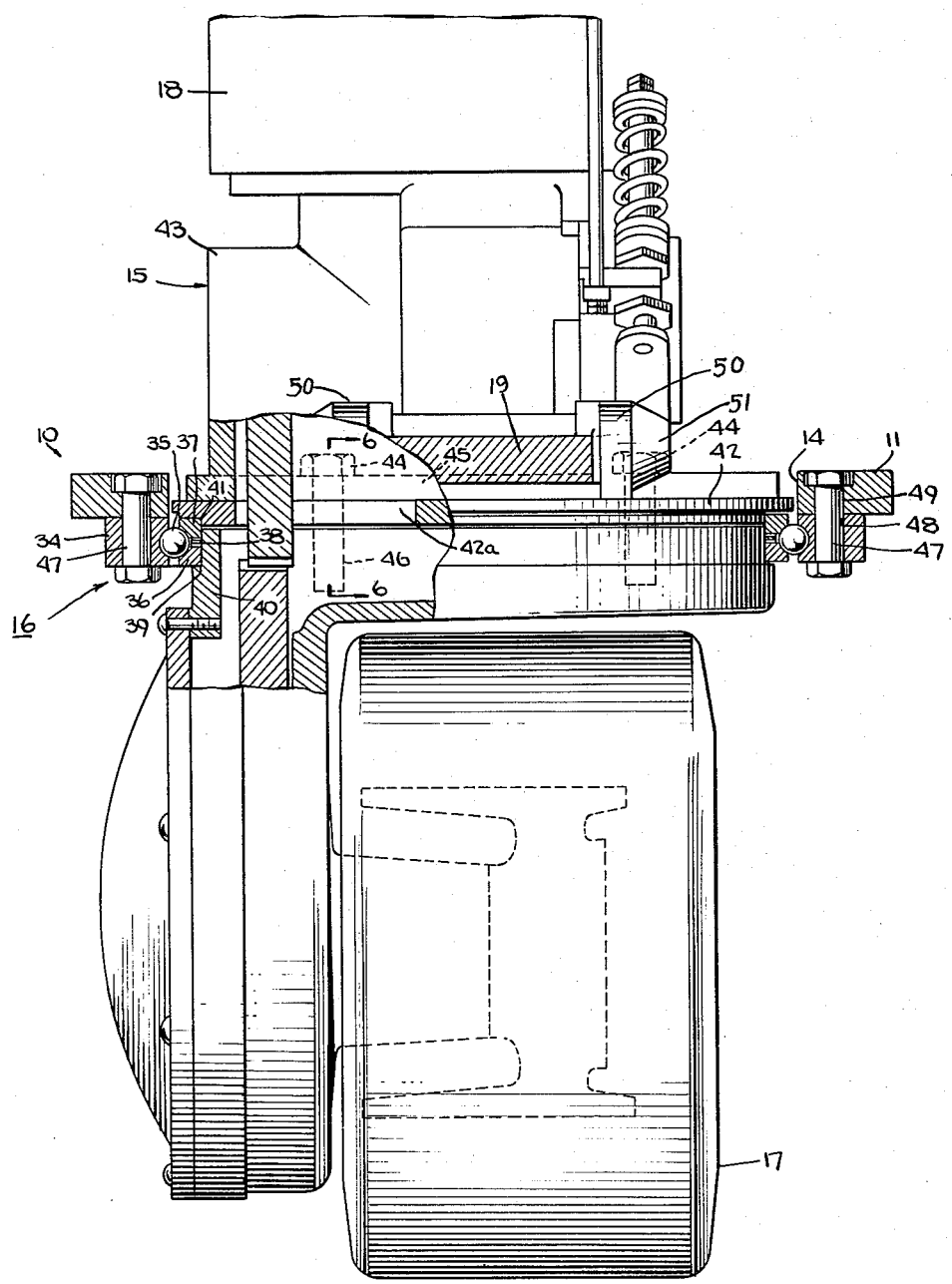
FIG. 5 is a view, partly in section, showing the mounting of the traction unit on the lifting head.

Referring to the drawings and in particular to FIG. 1, there is shown a pallet truck incorporating a lifting head 10 constructed in accordance with the invention. As best shown in FIG. 4, the lifting head 10 is formed by a simple, horizontal flat plate 11 and a pair of elongated, vertically extending tubes 12, which are secured to and extend through the plate 11 adjacent the rear edge. The tubes are suitably braced by plate gussets 13 which are welded, or otherwise secured, to the plate 11 and the sides of the tubes 12.

The plate 11 is provided with a central opening 14 in which a combined steering and traction unit 15 is mounted for steering rotation by means of a suitable bearing assembly 16 which is best shown in FIG. 5 and will be described in more detail hereafter. The unit 15 is of the general type shown in my United States Patent No. 2,950,773, dated August 30, 1960, and includes a steerable traction wheel 17 and an electric drive motor 18 which drives the wheel 17 through suitable gearing. The combined steering and traction unit 15 is adapted to be rotated by means of a pivotally mounted handle 19 to effect steering movement of the wheel 17. Handle 19 is provided with suitable switch means 20 for controlling the electric drive motor 18.

The load platform of the truck, generally designated by reference numeral 21, includes transversely spaced, horizontal, channel-shaped legs 22 which are adapted to be extended through a pallet. The legs 22 are welded, or otherwise rigidly secured, at their front ends to a transversely extending, horizontal plate 23. A transversely and vertically extending plate 24 in turn is secured at its lower edge to the plate 23 and is reinforced, or stiffened, at each side by vertically extending channel members 25 which are secured at their lower ends to the plate 23. A second transversely extending, horizontal plate 26 is secured to the upper ends of the channel members 25 and to the transversely extending vertical plate 24. A suitable battery housing 27 is mounted on the rear of vertical plate 24 and supported on the transverse plate 23. Batteries, not shown, for driving the electric motor 18 are enclosed within the housing 27.

In accordance with the invention, the front end of the load platform 21 is mounted for vertical movement relatively to the lifting head 10 through vertical shafts 28 which extend slidably through the tubes 12. As best shown in FIG. 3, the shafts 28 are considerably longer than the tubes 12 and are secured at both top and bottom to the upper and lower horizontal plates 26 and 23. The front end of the load platform 21 is adapted to be raised relatively to the lifting head 10 by means of a pair of hydraulic rams 29 having cylinders 29a attached at their upper ends to the transversely extending, horizontal plate 26 and piston rods 29b attached at their lower ends to seats or brackets 30 welded, or otherwise secured, to the sides of the tubes 12. Admission of fluid to the rams 29 to extend them, as shown in solid lines in FIG. 1 and in broken lines in FIG. 3, serves to raise the front end of the load platform 21 relatively to the lifting head 10 while the front end is guided through sliding movement of the shafts 28 in the tubes 12.

As best shown in FIGS. 1 and 2, the rear end of the load platform 21 is supported by wheels 31 which are mounted on links 32 which in turn are pivotally secured to the legs 22 adjacent the rear ends of the legs by means of pivot pins 33. Pivotal movement of the links 32, therefore, serves to raise or lower the wheels 31 relatively to the legs 22 of the load platform 21 to raise or lower the rear end of the platform 21. In the truck as illustrated in the drawings, the wheels 31 are pivoted downwardly by means of horizontally disposed hydraulic rams 34 which are mounted within the legs 22 adjacent the rear ends thereof and are connected to the links 32. This arrangement for pivoting the rear wheels downwardly is covered in my co-pending application Serial No. 160,072, filed Dec. 18, 1961, and entitled Industrial Truck. The rams 29 and the rams 34 on each side of the truck are preferably connected together in series and operated by fluid under pressure from a single combined pump and reservoir unit as described in said copending application.

It will be appreciated that in utilizng the truck to move a pallet supported load, the truck is first maneuvered to extend the legs 22 of the load platform 21 through the pallet while the platform is in the lowered position, as shown in FIG. 2. Fluid under pressure is then admitted to the rams 29 and the rams 34 to raise the front and rear ends of the load platform and the pallet supported on the legs 22 until the pallet has been lifted a few inches off the floor. The pallet is then transported while in this raised position through operation of the truck.

Referring now to FIG. 5, the bearing assembly 16, by which the combined steering and traction unit 15 is mounted in the opening 14 of the plate 11, includes an outer race 34, balls 35, and an inner race split horizontally into two sections 36 and 37, separated by shims 38. The two sections 36 and 37 of the inner race are clamped between a shoulder 39 provided adjacent the upper end of the lower housing 40 which supports the wheel 17, and a shoulder 41 provided on a plate 42 which is of a diameter to fit within the opening 14 in the plate 11 in the lifting head 10. The plate 42 supports a motor housing 43 in which the drive motor 18 and some of the gearing is mounted. The plate 42 is provided with a suitable opening 42a through which the gearing may extend from the motor housing 43 to the lower housing 40. The motor housing 43, plate 42 and lower housing 40 are clamped together by means of bolts 44 which extend through a flange 45 of the motor housing 43, the plate 42 and thread into suitable tapped openings 46 provided in the wall of the lower housing 40. Thus, when the motor housing, plate 42 and lower housing 40 are clamped together by the bolts 44, they form an integral unit with the bearing assembly 16 clamped between the shoulders 39 and 41. The unit so formed is attached to the plate 11 by means of bolts 47 which extend through holes 48 provided in the outer race 34 and through holes 49 provided in the plate 11 surrounding the opening 14, and the unit may be easily removed for servicing by removal of the bolts 47. The motor housing 43, together with the motor 18 also may be quickly detached by removal of the bolts 44 without removal of the rest of the unit from the plate 11. When the motor housing 43 is so detached, the plate 42 and upper part 36 of the inner race may be removed to assemble the balls within the outer race 34. As shown in FIG. 5, lugs or ears 50 which receive a pivot pin 51 for pivotally mounting the handle 19 are conveniently secured to or formed integrally with the upper surface of the plate 42.

From the preceding description, it can be seen that there is provided a very simple, inexpensive lifting head and mounting structure for a combined traction and steering unit which may be fabricated from inexpensive, readily available material, and which permits easy assembly and dissassembly of the traction unit from the lifting head, or the motor of the traction unit from the unit. Further, because of the use of elongated tubes, the clearance between the shafts which slide in the tubes may be relatively great without affecting their guiding function, thereby eliminating the necessity of costly machining to provide a close fit.

While one embodiment of the invention has been shown and described, it will be appreciated that this is for the purpose of illustration and that changes and modifications may be made therein without departing from the spirit and scope of the invention.

I now claim:

1. In a lift truck of the class described, a main frame having a forward vertical portion and an integral rearward extending load supporting portion, a pair of spaced free standing rods supported at their lower ends on a lower part of said forward vertical portion and fixed at their upper ends to an upper part of said forward vertical portion, a lifting head plate having a central opening and a pair of spaced vertically extending tubes secured integrally thereto, said tubes being centrally bored for the accommodation of said vertically spaced shafts, and being secured to said lifting head plate in the same spaced relation as said rods, and shorter than said rods, a pair of spaced hydraulic rams mounted between said tubes and an upper part of said forward vertical portion of said main frame and parallel to said tubes, whereby extension of said rams lifts said forward vertical portion relatively to said tubes and said lifting head plate, a steering and traction unit comprising a motor and a traction wheel driven by said motor, means securing said steering and traction unit for rotation as a unit relatively to said lifting head plate, lifting wheels mounted on the rearwardly extending load supporting portion of said main frame, and means for moving said lifting wheels relatively to said load supporting portion simultaneously with the vertical movement of said forward vertical portion of said main frame relatively to said tubes and lifting head plate.

2. In a lift truck of the class described, a main frame having a forward vertical portion and an integral rearward extending load supporting portion, a pair of spaced free standing rods supported at their lower ends on a lower part of said forward vertical portion and fixed at their upper ends to an upper part of said forward vertical portion, a lifting head plate having a central opening and a pair of spaced vertically extending tubes secured integrally thereto, said tubes being centrally bored for the accommodation of said vertically spaced shafts, and being secured to said lifting head plate in the same spaced relation as said rods, and shorter than said rods, a pair of spaced hydraulic rams each mounted between a fixed portion of one of said tubes and an upper part of said forward vertical portion of said main frame and parallel to said tubes, whereby extension of said rams lifts said forward vertical portion relatively to said tubes and said lifting head plate, a steering and traction unit comprising a motor and a traction wheel driven by said motor, means securing said steering and traction unit for rotation as a unit relatively to said lifting head plate, lifting wheels mounted on the rearwardly extending load supporting portion of said main frame, and means for moving said lifting wheels relatively to said load supporting portion simultaneously with the vertical movement of said forward vertical portion of said main frame relatively to said tubes and lifting head plate.

References Cited in the file of this patent
UNITED STATES PATENTS

| | | |
|---|---|---|
| 2,372,585 | Klumb | Mar. 27, 1945 |
| 2,545,440 | Barber | Mar. 20, 1951 |
| 2,592,091 | Weaver | Apr. 8, 1952 |
| 2,842,216 | Ulinski | July 8, 1958 |

FOREIGN PATENTS

| | | |
|---|---|---|
| 890,161 | Germany | Sept. 17, 1953 |